United States Patent [19]

O'Malley et al.

[11] Patent Number: 4,532,093
[45] Date of Patent: Jul. 30, 1985

[54] METHOD AND APPARATUS FOR THE MANUFACTURE OF MOLDED PACKINGS

[75] Inventors: Michael P. O'Malley, Stratford; David E. Henderson, Darien; Mark J. Cable, Shelton, all of Conn.; James E. Hefferon, Keene, N.H.

[73] Assignee: International Packaging Systems Inc., Norwalk, Conn.

[21] Appl. No.: 485,062

[22] Filed: Apr. 14, 1983

[51] Int. Cl.³ .................. B29D 27/04; B29C 1/04
[52] U.S. Cl. .................. 264/40.1; 264/46.4; 264/51; 264/101; 264/338; 425/89; 425/145; 425/259; 425/261; 425/347; 425/348 R; 425/817 R
[58] Field of Search .................. 264/40.1, 46.4, 54, 264/51, 101, 338; 425/145, 347, 348 R, 89, 117, 259, 261, 817 R; 53/464, 466, 111 R

[56] References Cited

U.S. PATENT DOCUMENTS

| | | | |
|---|---|---|---|
| 3,081,487 | 3/1963 | Heffner et al. | 264/54 X |
| 3,247,295 | 4/1966 | Burwell | 264/54 |
| 3,323,273 | 6/1967 | Lee et al. | 53/464 X |
| 3,529,320 | 9/1970 | Kerns et al. | 425/117 |
| 3,616,493 | 11/1971 | Okubo et al. | 425/347 |
| 3,677,681 | 7/1972 | Zippel et al. | 264/40.1 X |
| 3,916,023 | 10/1975 | Porter et al. | 264/40.1 X |
| 4,390,337 | 6/1983 | Gately | 264/46.4 X |

OTHER PUBLICATIONS

Buist, J. M., Edt., "Developments in Polyurethane-1", London, Applied Science Publishers Ltd., ©1978, pp. 68, 69.

Primary Examiner—Philip Anderson
Attorney, Agent, or Firm—Ronald J. St. Onge; Louis H. Reens

[57] ABSTRACT

A method and system are described for manufacturing molded packings used in the shipment of articles such as computers, typewriters and the like. The system employs a plurality of mold plugs positioned on a rotating platform whereby the mold plugs are alternately moved between work stations. At one work station a separator sheet is manually placed over a mold plug. At another work station a foaming material dispensing gun is automatically operated in a predetermined pattern over a mold which encloses the mold plug. The pattern is manually adjustable to fit any particular mold plug. Control over the system is obtained with a microprocessor programmed to operate with sensors and actuators associated with the system.

21 Claims, 16 Drawing Figures

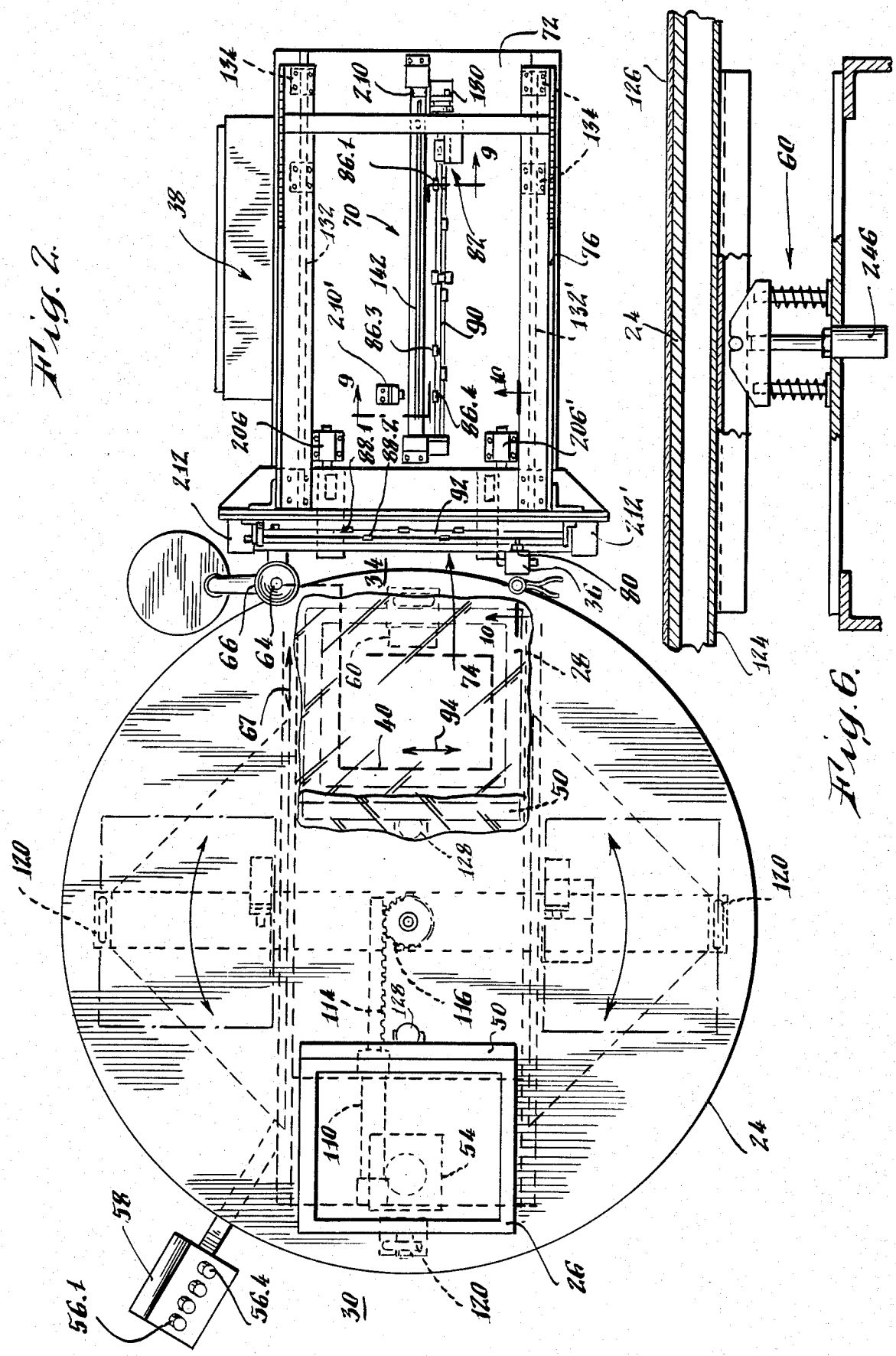

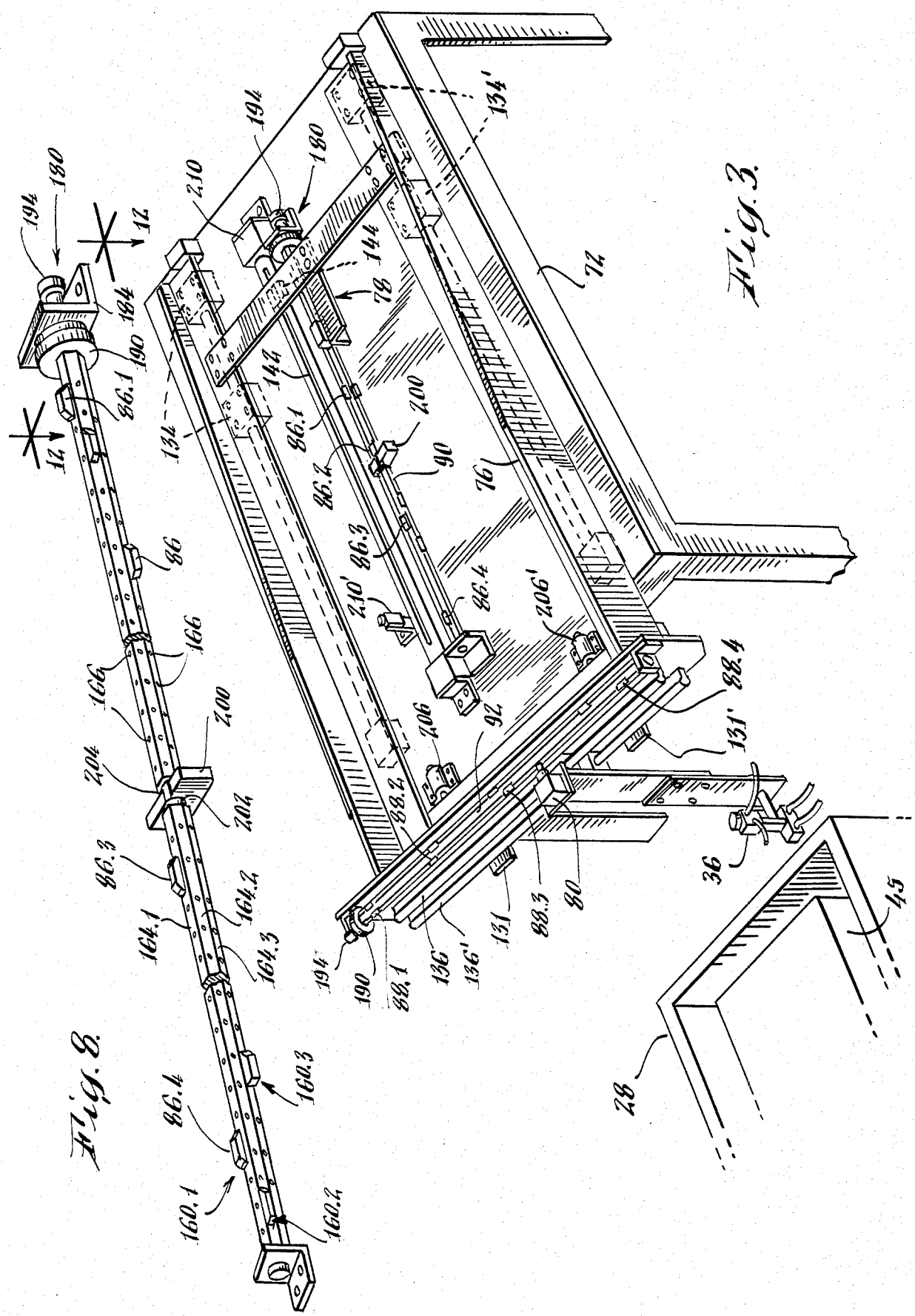

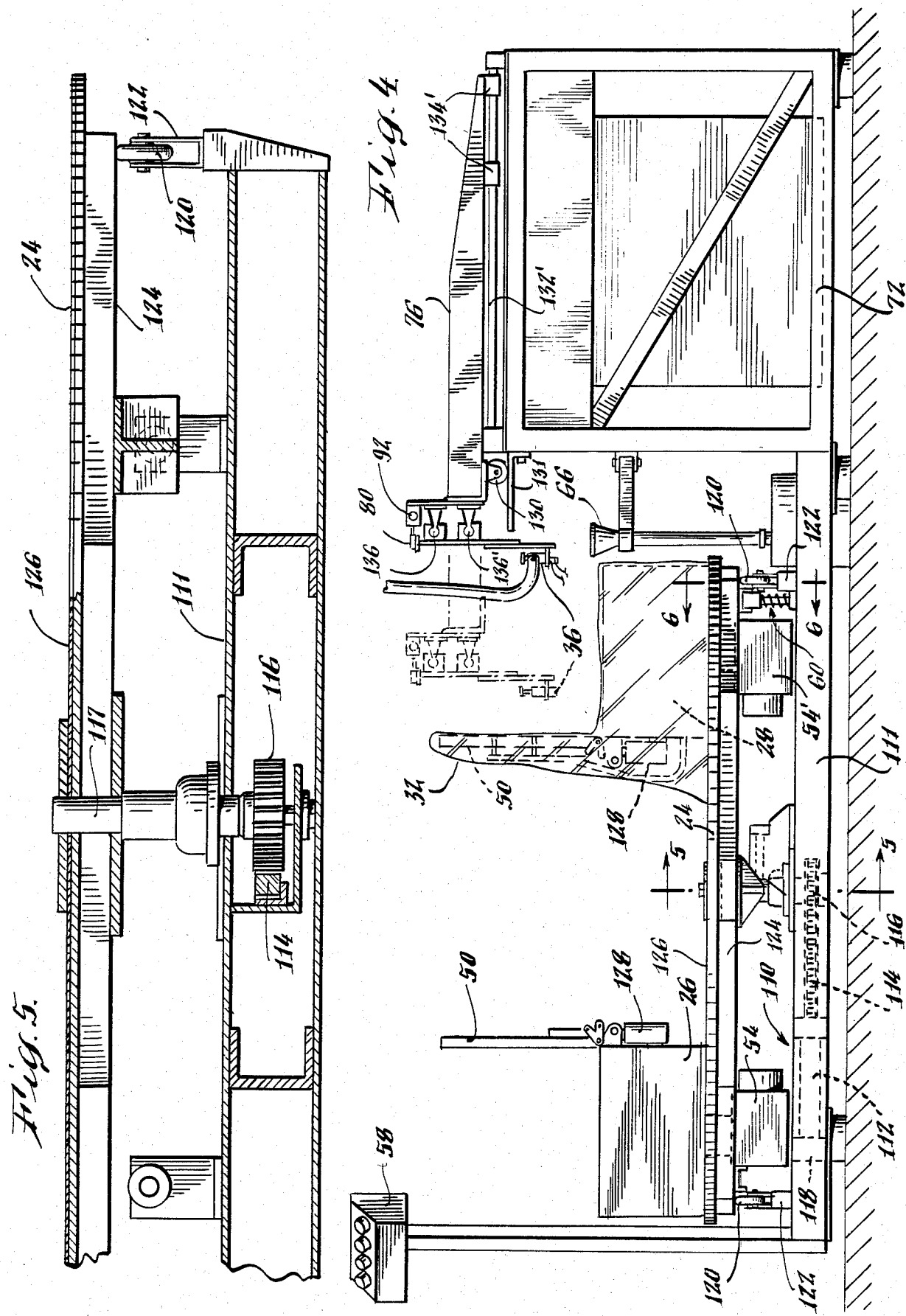

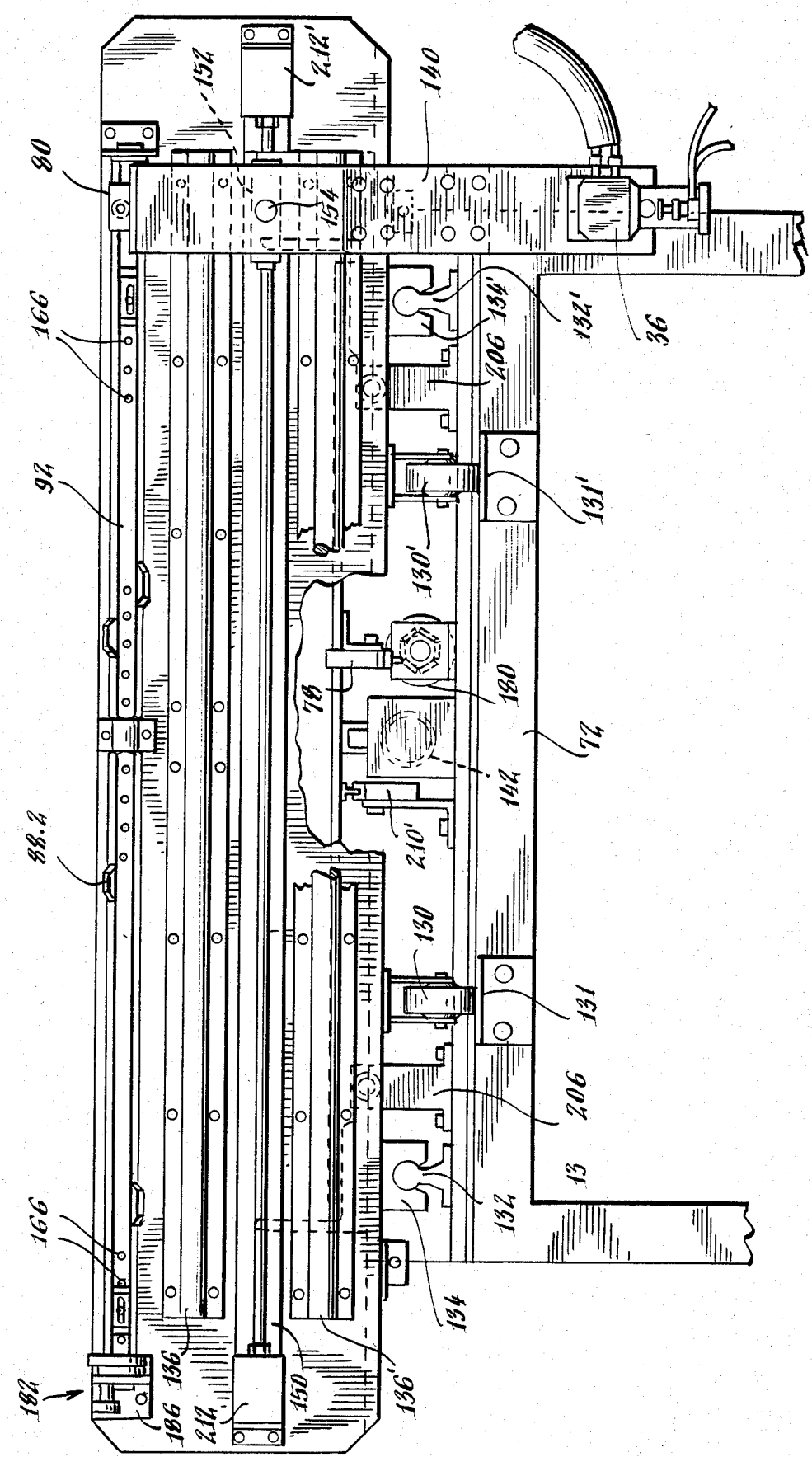

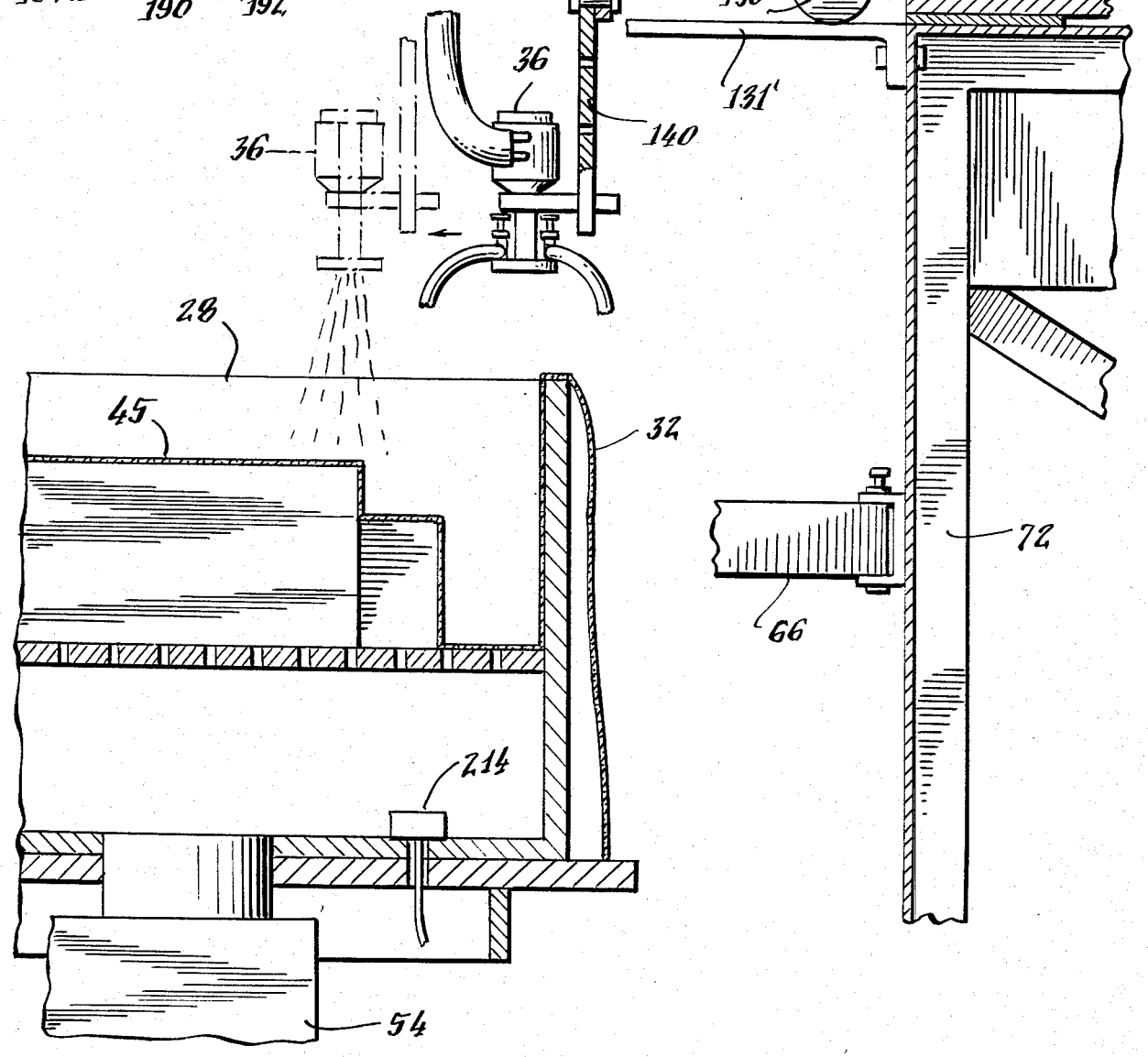

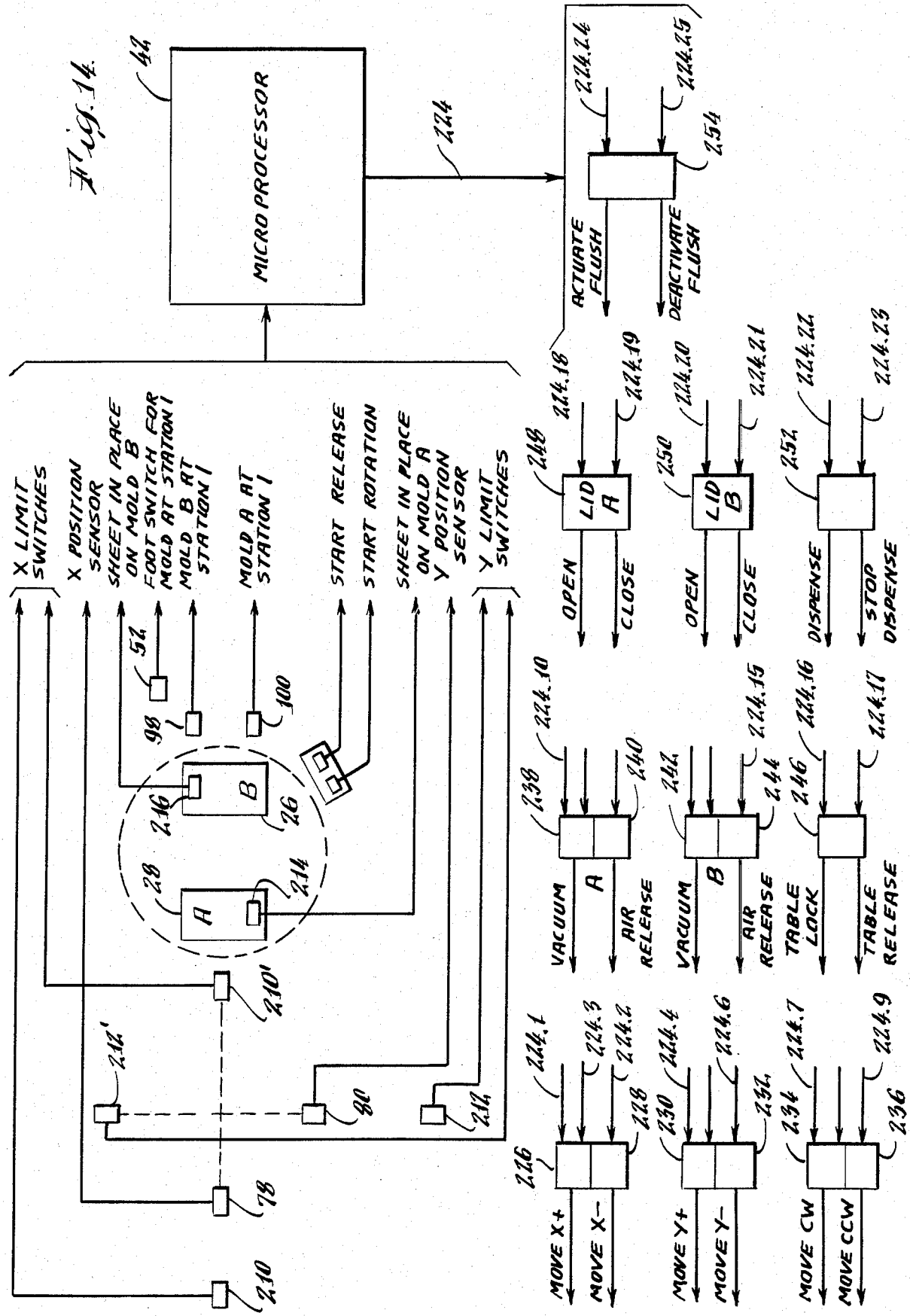

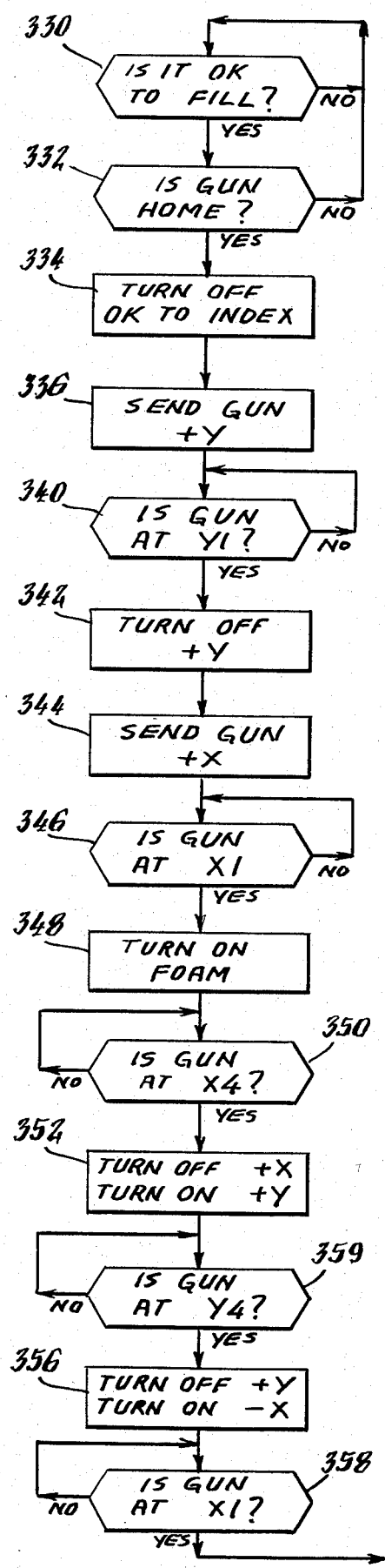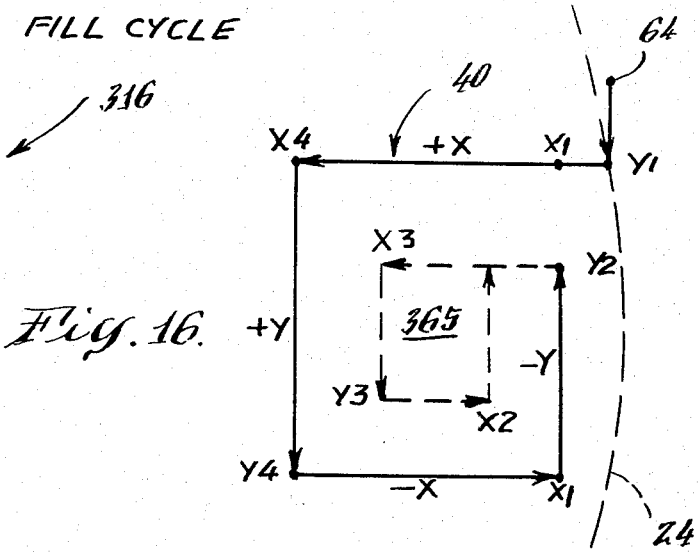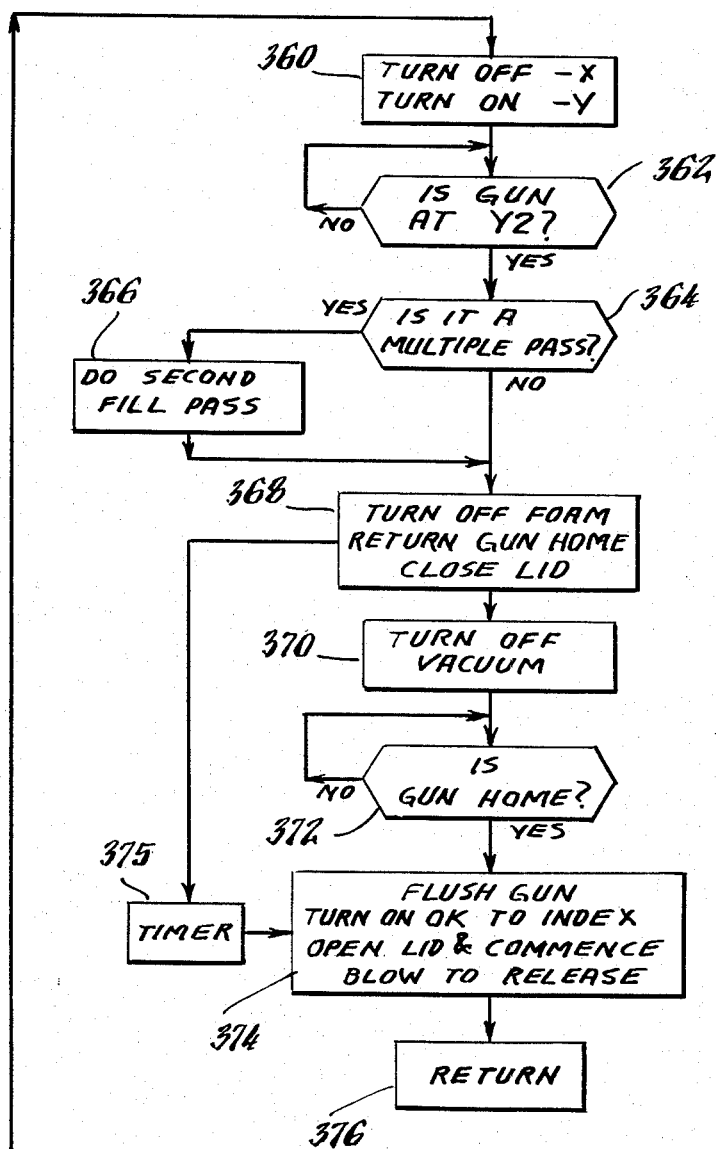

METHOD AND APPARATUS FOR THE MANUFACTURE OF MOLDED PACKINGS

FIELD OF THE INVENTION

This invention generally relates to a method and system for the manufacture of molded packings for use in the packaging of articles. More specifically, this invention relates to a semiautomatic method and apparatus for making molded packings.

BACKGROUND OF THE INVENTION

In the shipment of goods such as typewriters, video displays and the like, care must be taken to package such articles with sufficient protection against careless handling. One technique involves the formation of packings that are specifically shaped to fill a portion of the space between the articles and the container in which it is shipped.

One packaging technique involves a foam-in-place process wherein the article is placed in a container and a separator sheet material is tucked around the article. A polyurethane foam material is then poured into the space between the sheet and the container to fill the void and firmly support the article. Since such technique may result in the support of the article at sensitive areas where damage may result; hence, another packaging technique involves the preforming of foam packings that are shaped to fill selected voids in the space between the article and its container.

The preformed molded packings are made by using a plug having a shape that is generally representative of the article. The plug is mounted in the chamber of a mold box. A sheet material is then placed over the mold box opening and tucked into the cavities around the plug and over the inside surface of the lid. A vacuum is then formed between the sheet and the mold box so as to draw the sheet into the corners and various cavities around the plug in the box chamber. A foam is then poured over the sheet and the mold box lid is closed until the foam is cured. After curing the foam-in-place molded packing and sheet are removed from the box.

In another technique a mold plug projects from a platform and a polyethylene separator sheet is placed over it. A vacuum draws the sheet over the plug and a container with open flaps in which the article is to be shipped is placed over the plug to seat on the platform and form a mold with the plug. The foam is then injected into the container to form a molded packing directly in the container in which an article is to be shipped.

The time required to make a molded packing is a function of the time needed to insert the sheet material, pour the foam, await its cure and remove the sheet and plug from the completed packing. When a large number of molded packings need to be made, it becomes highly desirable to increase the speed of their manufacture.

SUMMARY OF THE INVENTION

With a method and system for making molded foam packings in accordance with the invention, a high output of high quality packings is obtained with the operator away from the pouring station.

This is obtained by placing at least a pair of mold plugs with which the packings are to be made on a rotatable support in the form of a table that rotates between at least first and second work stations. At the first work station an open mold is manually prepared such as by first removal of a completed packing and subsequent placement, over the mold plug, of a separator sheet made of a material to which the foaming material used to make packings does not adhere. At the second work station another mold, which has a separator sheet, receives the foaming material. The foaming material is applied in a predetermined pattern so as to assure filling of the space between a plug and the wall inside the mold to thus produce a properly shaped packing.

After foam is placed inside a mold, it is closed and the foaming material expands to fill voids in the mold and then cures. During this time a previously formed packing is removed from another mold plug which is thereafter manually provided with a separator sheet. When this sheet has been put in place, rotation of the platform is started to return the mold with its now cured foam to a work station where the operator again removes the packing and adds a separator sheet to repeat the process.

With a technique in accordance with the invention, molded packings can be made in rapid succession. The molds can be made so as to provide an upper packing in one and a lower packing in another. The number of work stations around the circular support may be selected so as to optimize the manufacture of packings.

In accordance with another aspect of the invention different molded packings may be conveniently formed by altering the pattern with which a foaming material dispensing gun is moved. Such pattern control is obtained in one embodiment with the use of arrays of pattern control elements that are located at predetermined positions. When the dispensing gun is moved, appropriate sensors detect the presence of an element and thereby cause the motion of the gun to be controlled with the aid of software in a microprocessor. The pattern control elements are adjustable so that the dispensing pattern can be made to fit the requirements for making a particular molded packing without having to alter software in the microprocessor.

As described herein with respect to one form of the invention, a foaming material dispensing gun is mounted on a movable frame with which the gun can be made to follow a desired rectangular pattern. A first drive controls motion of the gun in an X direction and a second drive, which is mounted on the first drive, controls motion of the gun in a Y direction that is transverse to the X direction. Control over the gun motion is obtained with arrays of cam-type pattern control elements arranged parallel with the X and Y drives respectively. Each drive has a switch located to be tripped by a cam. A microprocessor is coupled to sense the switch actuations and thus determine where the gun is and when its direction of motion is to be changed.

During operation, the dispensing gun is moved in a standard pattern whose particular path is determined by locations of the pattern control elements. The pattern can be altered in shape by moving the adjustable elements. In one embodiment such pattern change is conveniently implemented by mounting a plurality of arrays of pattern control elements along a common bar. A simple rotation of the bar may then place a desired array of pattern control elements into operational position and thus accommodate the manufacture of different packings in a quick and convenient manner.

It is, therefore, an object of the invention to provide a system and method for making molded packings in a rapid yet safe manner. It is a further object of the invention to provide a system and method for making polyurethane molded packings in a semiautomatic manner that enables a high rate of manufacture of consistently high quality packings.

These and other advantages and objects of the invention can be understood from the following description of an embodiment which is hereinafter described in conjunction with the drawings.

BRIEF DESCRIPTION OF DRAWINGS

FIG. 2 is a top plan view of the system of FIG. 1;

FIG. 3 is a slightly enlarged perspective view of the mechanism employed in the system of FIG. 1 for moving the foaming material dispensing gun;

FIG. 4 is a side view in elevation of the system of FIG. 1;

FIG. 5 is a partial section view of a rotating table assembly employed in the system of FIG. 1 and is a view taken along the line 5—5 in FIG. 4;

FIG. 6 is a partial section view of the rotating table assembly in the system of FIG. 1 and is a view taken along the line 6—6 in FIG. 4;

FIG. 7 is an enlarged front partially cut-away view in elevation of the gun drive shown in FIGS. 1 and 4;

FIG. 8 is an enlarged perspective view of a pattern control bar used in accordance with the invention;

FIG. 10 is an enlarged section view in elevation of the Y drive and is taken along the line 10—10 shown in FIG. 2;

FIG. 11 is an enlarged section view of a pattern selection device associated with the X direction drive shown in FIG. 2 and is taken along the line 11—11 shown in FIG. 2;

FIG. 14 is a block diagram of sensors and actuators used to control a system in accordance with the invention;

FIG. 16 is a flow diagram of steps employed in a foam dispensing cycle in accordance with the invention.

DETAILED DESCRIPTION OF EMBODIMENTS

Figure 1:
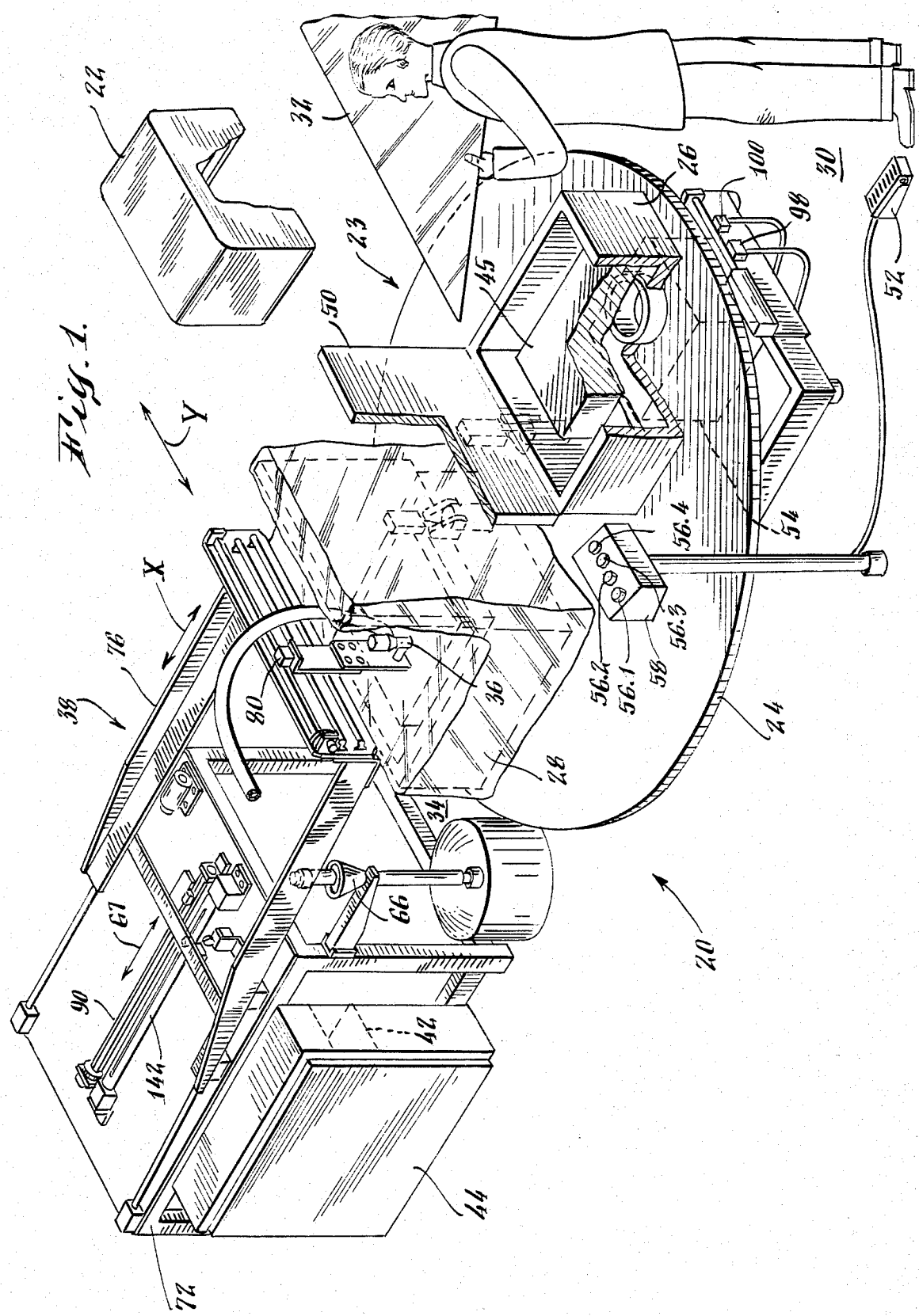
FIG. 1 is a perspective view of a molded packing manufacturing system in accordance with the invention.

With reference to FIGS. 1 and 2 a system 20 for the manufacture of polyurethane molded packings such as 22 is shown. System 20 includes a rotatable platform assembly 23 including a table 24 which supports a pair of mold plugs 45 inside mold boxes 26, 28 at diametrically opposite sides of table 24. Table 24 has two operative positions, the first being located at a work station 30 where a separator sheet 32 is manually placed over the mold box 26. A second operative position is at a work station 34 where a foaming material is supplied to mold box 28 by a gun 36 from a supply (not shown). The work stations 30, 34 are at diametrically opposite positions of table 24, thus separating an operator located at station 30 as far as possible from the foam pouring station 34. Table 24 rotates in the illustrated embodiment preferably in a reciprocal fashion, i.e. first clock-wise and then counterclock-wise to thus alternately bring each of the mold boxes 26, 28 to both of the work stations 30, 34. Mold boxes 26 and 28 may be formed of inverted cartons with open flaps and placed over mold plugs 45.

The foaming material is dispensed at station 34 from gun 36 that is supported by a drive 38 which is controlled to move gun 36 in a predetermined, precisely repeatable pattern 40, see FIG. 2, over the open mold box 28. Formation of pattern 40 is obtained with an electronic signal processor 42 mounted in housing 44 and operatively coupled to various sensors and actuators employed with system 20 as will be further described.

The operation of system 20 is as follows. An operator pulls a sheet such as 32 of polyurethane film from a roll (not shown) and shears it off with a suitable cutting edge (not shown). The severed sheet 32 is then draped over a plug 45 in the molding box 26 as well as its lid 50 and is tucked into the mold box by hand. During application of a sheet 32 foot switch 52 is actuated to operate a vacuum and release assembly 54 mounted below table 24 and in air flow communication with the interior of mold box 26. The actuation of vacuum and air release assembly 54 by foot switch 52 creates a vacuum between sheet 32 and mold box 26, thus tending to draw sheet 32 into the various cavities and crevasses of the mold 26. Lid 50 is also provided with suitable conduits in communication with the vacuum created inside mold box 26 so that sheet 32 remains draped over lid 50 as the sheet is tucked into mold box 26. The vacuum and air release assembly preferably are of the type as more particularly described in co-pending patent application entitled "Vacuum Air Release Assembly" and filed by Michael P. O'Malley and Alfred R. Thibault on August 16, 1982, bearing Ser. No. 408,453 and now U.S. Pat. No. 4,493,627.

When the polyurethane sheet 32 is in place, the operator actuates a start switch 56.1 on an adjacently located control 58 and causes table 24 to rotate 180° while the vacuum is maintained by the vacuum and air release assembly 54. Control 58 includes a power-on switch 56.3 and reset switch 56.4 with which various solenoids, relays and the operation of the microprocessor 42 are set in initializing states. When table 24 has rotated mold box 26 with sheet 32 to the foaming material dispensing station 34 a table lock 60 (see FIG. 6) is automatically actuated to hold table 24 in position while foaming material dispensing gun 36 pours foaming material into mold box 26 along desired dispensing pattern 40 (see FIG. 2). During rotation the vacuum and air release assembly 54' associated with mold box 28 has been automatically acutuated by virtue of a signal from microprocessor 42 to pressurize the space between the separator sheet 32 and mold plug 45 and thus at least partially release the molded packing. The pressurization is preferably made sufficiently high to cause a molded packing to be levitated so as to almost fully emerge. This facilitates removal of the completed packing. After the operator has manually removed the packing from mold box 28 or the packing and carton from a mold plug 45 as the case may be a new polyurethane sheet 32 is draped and tucked into the now empty mold box 28 or over a mold plug 45 and a new open carton placed over the plug and sheet with open flaps.

Dispensation of foaming material commences by moving gun 36 from a home position at 64 (see FIG. 2) over a drain 66 along a rectilinear path that starts out in an X direction as defined by arrow 67 along a first path 68.1. This motion is produced with an X drive 70 that is mounted on top of a frame 72 and a Y drive 74 mounted on a frame 76 supported by X drive 70. Both drives 70, 74 are provided with respectively parallel oriented gun position sensors 78, 80 (see FIGS. 3, 7, 10, and 11). The position sensors 78, 80 are respectively formed of switches that travel with frame 76 and gun 36 respectively for actuation by pattern control elements 86, 88 (see FIGS. 3 and 7) adjustably mounted on pattern control bars 90, 92.

When gun 36 is, for example, to be moved in a pattern 40 as shown in FIG. 2, the X drive 70 initially moves gun 36 until the fourth pattern control element 86.4 is sensed. This cause the X drive 70 to be deactivated while activating Y direction drive 74 which operates in the direction of double headed arrow 94 that is transverse to the directions of double headed arrow 67.

The dispensation of foaming material is commenced when Y direction position sensor 80 (see FIG. 2) senses, for example, the Y direction pattern control element 88.2 and continues throughout the balance of the path 40 traversed by gun 36.

When foaming material has been dispensed into mold 26 along the pattern 40 overlying the mold at work station 34, lid 50 of the mold is automatically closed and remains closed for a time sufficient to allow the foam to rise to the desired level and finish its cure. After this time period the lid 50 of the mold box opens automatically. Rotation of the table and thus a return of a foam filled mold to work station 30 occurs after the operator has actuated switch 56.1 on control 58. This process of foam filling, removal of packing and preparation of mold boxes for the next filling cycle can be continued in a rapid, highly efficient manner. In the event a mold box is the carton in which a molded packing 22 is to be made, the latter is removed with its carton but without reopening of the carton flaps.

As part of the foam filling cycle, the X and Y drives 70, 74 cause the gun 36 to be automatically returned to home position 64 where a flushing agent from a source (not shown) is passed through gun 36 to remove any remaining foaming materials. The flushing agent is passed into drain 66 and recycled to a source (not shown).

In the embodiment illustrated herein, the table 24 is rotated back and forth 180° in clockwise and counter-clockwise directions. For example, a first rotation of table 24 from its position as shown in FIG. 1 commences in a clockwise direction whereby mold box 26 or A is brought to station 34 and mold 28 or B to work station 30. The next rotation is reversed, thus bringing in the mold boxes 26, 28 back to the positions as shown in FIG. 1. Table 24 is provided with switch actuated sensors 98, 100 which respectively detect the arrival of molds 26, 28 at work station 30. Sensors 98, 100 may be of various forms, such as switches, and located at such other places as appear desirable as long as they can identify which mold is at which work station.

Once the table 24 has completed its rotation so as to locate a completed foam packing at station 30, the foot switch 52 for actuating the vacuum for the mold box at station 30 is automatically enabled. Hence, after manual removal of the completed packing and the separator sheet beneath it, the operator determines when the vacuum mode of the vacuum and air release assembly 54 for that mold box is to activated. This vacuum condition, once it has been activated, stays on for that mold box until the release mode is needed, i.e. after foam pouring and curing and in this case also after table rotation is begun.

Reciprocal rotation of table 24 may be obtained as shown in FIGS. 4 and 5 with a linear to rotation converter 110 mounted on a stationary frame 111. This includes a pneumatic cylinder 112 connected to reciprocate a rack 114 that operatively engages a spur gear 116 connected to table 24 by a shaft 117. In place of converter 110 a suitable electric motor can be used to rotate table 24. Reciprocation of pneumatically powered converter 110 is obtained with a solenoid actuated two position valve 118. Control signals for valve 118 are generated by the microprocessor 42.

Table 24, as illustrated in FIGS. 4 and 5 is supported by four peripherally located and distributed wheels 120. The wheels 120 are mounted on suitable supports 122 on frame 111 and are located so that they engage an undersurface 124 of table 24. Table 24 further is shown provided with a layer 126 of polyethylene so that any spilled polyurethane foam can be easily removed.

FIGS. 4 and 5 further show pneumatically powered actuators 128 connected to open and close lids 50. Actuators 128 are electrically energized with control signals from microprocessor 42 coupled to appropriate solenoid valves (not shown). Actuators 128 are made sufficiently powerful to maintain lids 50 closed against an expanding foam inside molds 26, 28. When mold boxes 26, 28 are formed of a carton, a flap closure mechanism, as is well known in the art, is used to close the carton after foaming material has been poured. Clamping devices may be used to temporarily hold a carton down on platform 24 while being automatically released when the carton with its molded packing is to be removed such as with the aid of pressurized air from an assembly 54.

Movable frame 76 is supported by stationary frame 72 with rollers 130, 130' that ride on partially extending rails 131, 131' (see FIG. 7) and guided in the X direction by rails 132, 132' engaged by slides 134, 134'. Gun 36 is supported by a pair of Y direction oriented rails 136, 136' mounted on frame 76 and engaged by slides 138, 138' (see FIG. 10). A bracket 140 affixed to slides 138, 138' directly supports gun 36.

Motion of frame 76 along the X direction is pneumatically controlled with a rodless cylinder 142 which is a commercially available actuator and is mounted to frame 72. Piston 144 (see FIG. 9) inside cylinder 142 is affixed to movable frame 76 with a vertical shaft 146 extending through a slot 148 in cylinder 142.

In a similar manner Y direction motion is obtained with a rodless cylinder 150 (see FIG. 7) and piston 152. Cylinder 150 is connected to frame 76 but oriented to move gun 36 in the Y direction. A shaft 154 (see also FIG. 10) connects piston 152 to bracket 140.

A particularly advantageous feature of system 20 involves its adaptability to make different molded packings by adjusting the position of pattern control elements 86 and 88 along pattern control bars 90, 92 without having to alter instructions inside microprocessor 42 (see FIG. 1). In the embodiment, pattern control bars 90, 92 are provided with a plurality of arrays 160, 162 (see FIGS. 8, 9 and 12) of pattern control elements 86, 88 respectively.

The arrays, such as 160 in FIG. 8, are distributed on different surfaces 164 of a multifaceted control bar 90 or 92. The bars 90, 92 are mounted for rotational adjustment with bar 90 mounted to frame 72 and bar 92 to frame 76. With the discrete rotational positions a desired array 160 of pattern control elements 86 can be placed into operative position with element sensor 78 (see FIG. 9) or 80 (see FIG. 10).

Figure 12:
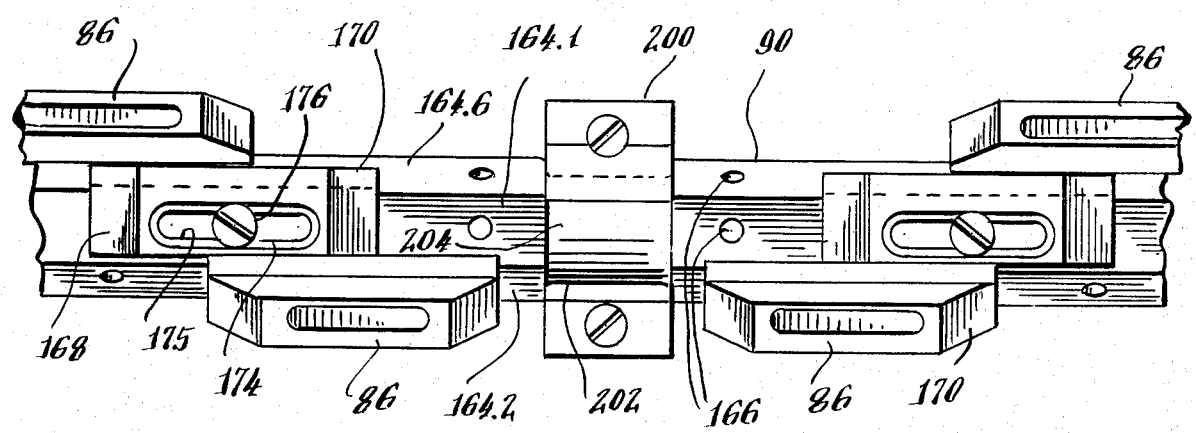
FIG. 12 is a partial top plan view of an X direction pattern selection control bar employed in the gun drive shown in FIG. 9.
Figure 13:
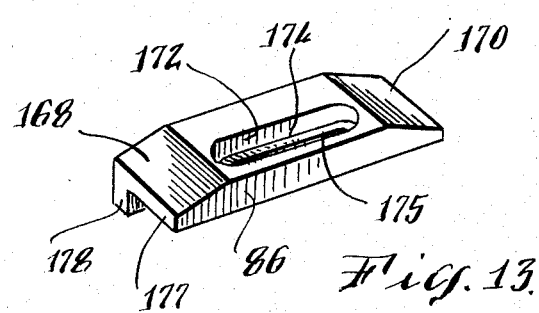
FIG. 13 is a perspective view of a pattern control element employed on the pattern control of FIGS. 9 and 12.

Thus, with reference to FIGS. 8, 12, and 13 pattern control bars are shown with six surfaces 164 (164.1 through 164.6), each of which is penetrated at regular spacings by threaded holes 166. As shown in FIGS. 12 and 13, each pattern control element 86 or 88 is a cam with sloping sides 168, 170 and a central slot 172 with a recessed clamping surface 174 which has a slot 175 through which a screw 176 is passed to fasten the element to a bar 90 or 92. Each element 86 and 88 has an L shaped body with one part 177 containing slot 172 adapted to seat on a pattern bar surface 164. Another part 178 is sized to engage an adjoining surface 164 when placed on a bar 90 or 92 and thus prevent rotation of an element even though it is held onto a bar by a single screw. Cams 86, 88 may be located at a desired hole 166 and then further positioned relative to a screw placed in a hole. Rollers 179 affixed to the actuating arm (not shown) of sensors 78, 80 are used to engage and thus sense elements 86, 88.

The individual arrays 160 and 162 of pattern control elements 86, 88 may be advantageously selected to establish desired foaming material dispensing patterns such as 40. To adjust the X, Y dimensions of a pattern, the pattern control bars 90, 92 may be quickly rotated from one position to another with an end located pattern selector 180 for X bar 90 (see FIG. 11) and 182 for Y bar 92 (see FIG. 7). Selectors 180, 182 are alike and include L shaped brackets 184, 186 respectively connected to frame 72 and 76. Each control 180, 182 has a disc 190 attached to the bar. The discs 190 have holes 192 that are so located relative to bar surfaces 164 and relative to a spring loaded retractable pin 194 so as to enable selection and alignment of an array 160 with the switch 82 (see FIG. 9). This is obtained by first retracting pin 194 and then rotating the bar 90 or 92 as the case may be to select the desired array.

Since the X direction bar 90 is long, a centrally located support 200 (see FIG. 12) is provided. Support 200 is affixed to frame 72 and has a cylindrical seating surface 202 sized to receive a corresponding cylindrical recessed surface 204 of bar 90. Motion of the frame 76 along the X direction may involve sufficient speeds to warrant use of shock absorbers 206, 206' oriented to buffer the returning frame 76. Suitable limit stops may be used.

Operation of system 20 is done in a semiautomatic manner under control by microprocessor 42 which may be commercially available programmable controller. This receives input signals from sensors and controls and generates output signals to external devices to actuate solenoids or relays as required. The latter in turn may regulate pneumatic actuators. Input and output signals are generated through well known microprocessor parts using known programming techniques. Sampling of sensors is done at a sufficiently high rate to assure timely detection of the onset of a particular event. For example, while a pattern element sensor such as 78 or 80 is moved onto the flat part of a cam element 86 or 88, the microprocessor samples the sensor frequently enough to assure detection of actuation of sensor 78 or 80 while it is in contact with an element 86 or 88.

With reference to FIG. 14, sensors are shown such as X direction limit switches 210, 210', the X position sensor 78 and similarly Y direction limit sensor switches 212, 212' and Y position sensor 80. Each mold box 26, 28 has a vacuum pressure sensor 214, 216 which enables system 20 to determine whether a separator sheet 32 (see FIG. 1) has been placed over a mold box 26 or 28 prior to dispensing foaming material. These various sensor signals are applied to microprocessor 42 for its control of operation of the system with a routine as will be further described.

Microprocessor 42 also generates output signals selected to activate various devices. The output signals may, for example, be particular bits in digital outputs. One set of two output bits on lines 224.1 and 224.2 may control, for example, actuation of several X drive solenoid controlled valves 226, 228 whose actuations cause gun motion along the X direction either forward (X+) towards a mold box, or in reverse (X−) away from the mold. A third bit on line 224.3 can be used to deactivate the X drive 70 entirely by resetting the solenoid valves 226, 228. Flip flops may be used to store control signals and the application of control signals may be implemented differently using other control circuits as are generally well known in the art.

The control of gun 36 along the Y direction is implemented with solenoid control valves 230, 232 that are coupled to Y drive 74 and controlled with signals on lines 224.4–224.6. Index motion of table 24 is implemented with solenoids 234, 236 and controlled by signals on lines 224.7–224.9. Solenoids 238–244 are used to actuate the vacuum and air release assemblies 54, 54' (see FIG. 4). A solenoid 246 is shown as used to activate and release the table lock 60 (see FIG. 6) though in practice the table lock 60 is preferably energized by a lever (not shown in FIG. 6) that is coupled to the rotating table 24. In this manner table 24 is mechanically locked into position, though released by a signal applied to solenoid 246. Solenoid 246 may operate a pneumatic valve (not shown). Solenoid valves 248, 250 initiate the opening or closing of the lids 50 of the mold boxes 26, 28. A solenoid 252 is used to activate (dispense foaming material) or deactivate gun 36 and solenoid 254 is used to implement a flushing cycle.

Control over system 20 employs a program in microprocessor 42 as shown at 280 in FIG. 1. During an initializing step at 282, flags and external devices are reset or set in predetermined states and this includes assuring that dispensing gun 36 has been returned to its home position 64 (see FIG. 2).

Figure 15:
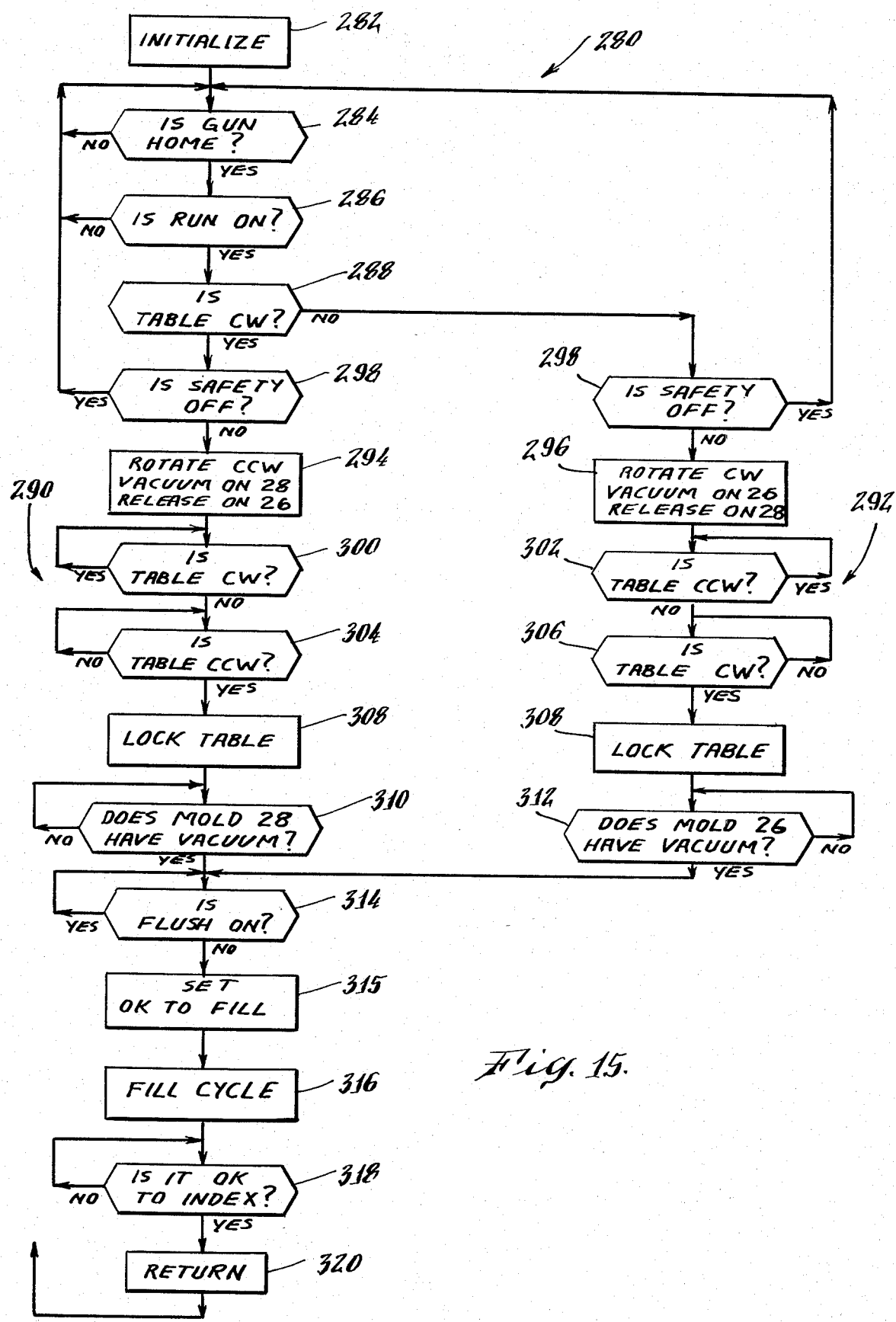
FIG. 15 is a flow diagram for a microprocessor to control the system of FIG. 1.

At 284 a check is made whether gun 36 is at its home position 64. This may be done, for example, by checking the status of the X limit switch 210 (FIG. 14) and Y limit switch 212. If the gun is not home, a waiting cycle is commenced by returning to the beginning of check 284 (FIG. 15).

Figure 9:
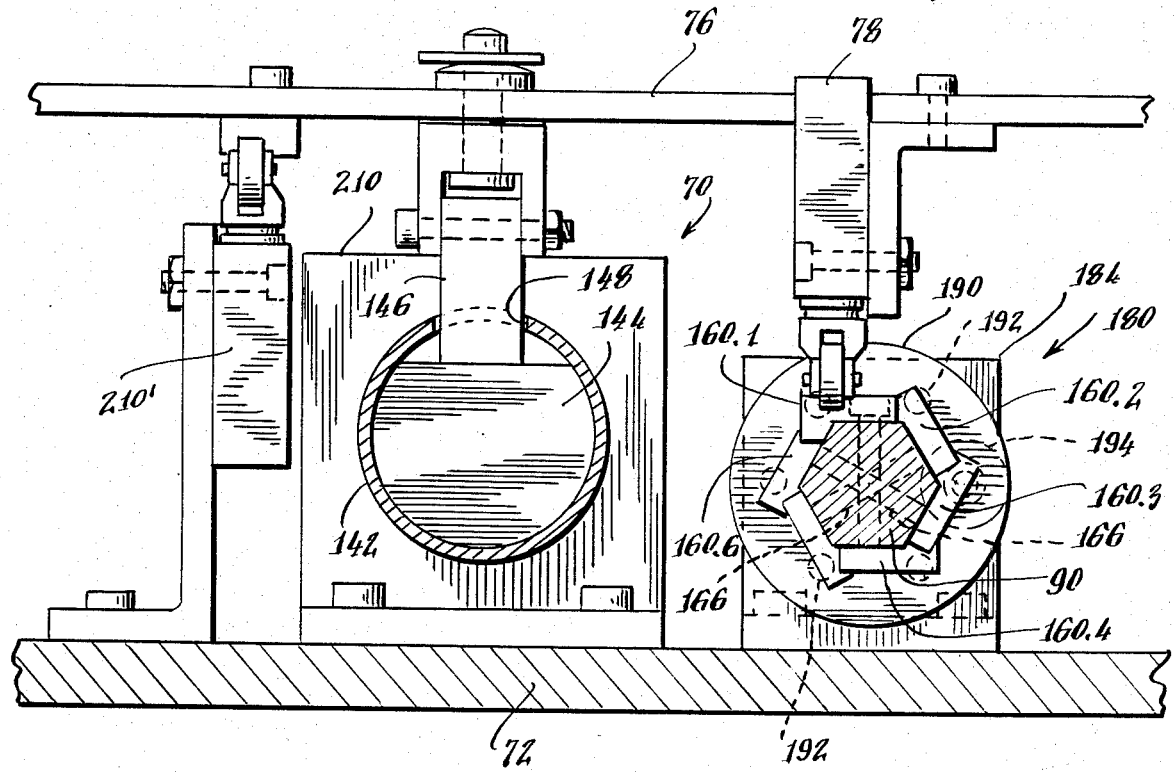
FIG. 9 is a section view of the X axis drive for the gun and is taken along the line 9—9 shown in FIG. 2.

Problems may arise if the mechanical movement that is being monitored is delayed due to equipment failure or the like. Accordingly, although not shown in FIG. 15 and with other control steps, a timer may be associated with a waiting routine so that the program can alert the operator if an awaited event fails to occur within some tolerable interval. For example, if the frame 76, see FIG. 9, is pulled back too far so as to engage a limit switch such as 210, the program waits a minimum interval for the actuation of limit switch 212 signifying that the gun is home. If this does not occur, it is assumed that there is a problem and the dispensation of foam is terminated and the X and Y drives are automatically actuated to return the gun to its home position 66.

At 286 a check is made whether a control switch 56.2 (see FIG. 1) enabling operation of the system 20 has been placed in the RUN condition and the operator has actuated the start control switch 56.1 to signify completion of the preparation of a mold, i.e. removal of a packing and placement of a new separator sheet 32. A check is then made at 288 whether the table 24 is in its most clockwise position, such as by sensing the status of switches 98, 100 (see FIG. 1). A routine 290 is followed to index table 24 counter clockwise at 292 if check 288 is affirmative and a routing 292 if table 24 is at its most counter clockwise position.

Rotation of table 24 is permitted at steps 294, 296 by sending appropriate signals to solenoids 234 or 236 (see FIG. 14) provided adequate safety conditions have been satisfied as sensed at steps 298 (FIG. 15) and the foaming material has completed its expansion. The vacuum and air release assemblies 54, 54' are activated so as to maintain a vacuum either in mold 26 or mold 28 whichever is being rotated to work station 34 while pressurizing the mold containing the expanded foam and opening its lid. In the embodiment rotation is not begun until after an interval deemed sufficient for the foam in the mold at work station 34 to have completed its expansion. The microprocessor signal employed to initiate rotation may thus also be employed to open the lid and pressurize the mold.

A safety review may involve checking the status of certain sensors, such as the X and Y limit switches 210, 212 and foot switch 52 (see FIG. 1) or other sensors as will assure protection of both the operator and system 20.

As the table 24 is rotated, checks are made such as at 300 and 302 that table rotation has begun and has been completed at 304, 306. Thereafter, further indexing motion is prevented by activating at 308 table lock 60 (see FIG. 6) with a signal to solenoid 246 (see FIG. 14).

Checks are made at steps 310 to assure that a separator sheet 32 (FIG. 1) is placed in the mold that has been rotated to work station 34. This is done by sensing the status of pressure sensor 212 in mold 26 at 310 and that of pressure sensor 214 in mold 28 at 312.

In the event the gun 36 is not being cleaned by flushing, as determined at 314 by sensing an appropriate flag in the routine, a fill flag is set at 315 and a fill cycle is entered at 316. This enables the dispensation of foaming material into the mold that has been rotated to work station 34. At the end of the fill cycle 316, a check is made at 318 whether the table is ready to be rotated, i.e. whether a new separator sheet has been placed over the mold at work station 30 and the operator has activated control switch 56.2. If so, a return is made at 320 to repeat routine 280.

One advantageous feature of system 20 involves its adaptability to deposit foaming material in different patterns 40 (see FIG. 16). The pattern 40 may be changed by adjusting the positions of pattern control elements 86, 88 along pattern control bars 90, 92 respectively. The general shape of the pattern is thus as indicated at 40 in FIGS. 2 and 16 with the locations of the corners of the pattern changeable by way of physical adjustment of the pattern control elements.

Routine 316 commences at 330 with a check of a flag and confirmation that gun 36 is at its home position 64 at 332. The flag authorizing turning or indexing of table 24 is deactivated at 334 and a signal is applied at 336 to solenoid 230 (see FIG. 15) to energize the Y drive 74 and advance gun 36 in the +Y direction.

The routine detects the passage of the Y drive position sensor 80 (see FIG. 10) past pattern control element 88 and counts these with a counter (not shown). When the first Y direction element 88 has been detected at 340 (FIG. 16), the Y drive 74 is turned off at 342 and the gun 36 advanced in the +X direction at 344.

Detection of the first X direction element 86 at 346 causes the application of an enabling signal on line 224.22 (see FIG. 14), thus causing gun 36 to dispense foaming material at 348.

Motion of gun 36 is controlled along the pattern 40 using the steps 350-362. At 364 a check is made whether a multiple pass such as outlined at 365 is needed. If so, then a 366 the gun is moved to follow fill motion path 365 in the manner as described with reference to path 40. If another pass is not needed, the foam dispensation is turned off, the gun returned to its home position and the lid is closed at step 368.

The vacuum for the mold at the work station 34 where foam is dispensed is turned off at 370 and when the gun has returned to its home position as determined at 372, the X and Y drives are automatically deactivated and steps as indicated at 374 are completed. For example, the gun is flushed with a solvent by energizing solenoid 254 (see FIG. 1), the flag authorizing table indexing motion is enabled and the mold box lid 50 opened after the elapse of an adequate curing interval usually about 20 seconds as measured with a timer 375 started when the lid is closed at 368. A blowing of air to release the cured packing is then begun and a return is made at 376 to step 318 in routine 280 of FIG. 15.

Having thus described a method and apparatus for manufacturing molded packings in accordance with the invention, its advantages can be appreciated. The speed of producing packings can be significantly accelerated. Variations from the described embodiment can be made without departing from the scope of the invention.

What is claimed is:

1. A method for manufacturing molded upper and lower packings comprising the steps of:
rotating at least a first and a second mold plug respectively located in first and second mold boxes for respectively forming upper and lower packings between at least first and second work stations;
lining the first mold plug and inner surface of the first mold box with a separator sheet at one work station;
rotating said lined first mold box enclosing a mold plug to another work station while rotating the second mold box enclosing a mold plug to a work station;
supplying a foaming material in a preselected pattern into said lined first mold box enclosing a mold plug at the other work station to form a molded upper packing;
closing the mold box to which said foaming material has been supplied;
rotating the mold box to which foaming material has been supplied away from the other work station;
permitting the foaming material to fully foam and to cure
removing a molded upper packing at a location that is away from the one work station where the foaming material is being supplied and during the formation and removal of said upper packing in the first mold box, forming a lower packing within the second mold box by placing a separator sheet over the mold plug therein and inner surface of the second mold box to form a lining therefore at one work station and supplying foaming material at another work station, closing and rotating the second mold box and removing the lower packing therefrom at a location that is away from the station where foaming material is supplied into the second mold box.

2. The method of manufacturing molded packings as claimed in claim 1,
wherein the mold boxes are rotated back and forth between said work stations.

3. The method for manufacturing molded packings as claimed in claim 1 wherein the removing steps each include the step of:
blowing air into a mold box between the separator sheet and the mold plug to at least partially release by levitating a molded packing therein.

4. The method for manufacturing molded packings as claimed in claim 3 wherein the removing step still further includes the steps of:
commencing rotation of the mold with foaming material a predetermined time interval following the supply of foaming material thereto; and
enabling the blowing of air following said interval.

5. The method for manufacturing molded packings as claimed in claim 4 wherein the step of placing a separator sheet includes the steps of:
evacuating, at said one work station, air from space between the separator sheet and the mold plug to draw the sheet around the mold plug and maintaining the evacuated condition at least until the mold plug with its separator sheet has been rotated to the other work station and foaming material is being supplied.

6. The method for manufacturing molded packings as claimed in claim 1 wherein the step of supplying a foaming material includes the step of moving a foaming material dispensing gun from a rest position in a preselected precisely repeatable pattern over a mold box that has been rotated to the other work station.

7. The method for manufacturing molded packings as claimed in claim 6 wherein the step of supplying foaming material further includes the steps of:
sensing discrete positions of the gun along orthogonally related directions; and
controlling in response to said sensed gun positions the movement of the gun along said directions to establish said preselected precisely repeatable pattern for the gun.

8. The method for manufacturing molded packings as claimed in claim 7 and further including the step of:
selecting said discrete positions of the gun.

9. The method for manufacturing molded packings as claimed in claim 11 wherein the step of selecting said discrete positions includes the step of:
selectively placing senseable pattern control elements in arrays that are respectively parallel to the orthogonally related directions and
detecting said pattern control elements.

10. A method for manufacturing molded packings from a mold comprising the steps of:
successively rotating at least a first and a second mold for respectively forming upper and lower packings between at least first and second work stations so that when one mold is at one work station another mold is at the other work station:
placing a separator sheet in operative relationship inside the molds when they are at said one work station;
evacuating air from the space between the separator sheet and the molds over which the sheet is placed to enable the separator sheet to be drawn into cavities of the mold and maintaining the evacuation of air at least until the mold with the separator sheet has been rotated to the other work station;
supplying a foaming material to the mold rotated to the other work station from a dispensing gun;
sensing selectable discrete positions of the gun along orthogonally related directions;
controlling, in response to said sensed gun positions, the movement of the gun along said directions to establish a preselected precisely repeatable pattern for the motion of the dispensing gun;
closing the mold to which foaming material has been supplied;
rotating the mold to which foaming material has been supplied to the one work station while the other mold is rotated to the other work station;
blowing air into the space between the separator sheet and the mold which has cured foaming material to the one working station to levitate the molded packing from the mold and facilitate removal thereof.

11. The method for manufacturing molded packings as claimed in claim 10 wherein the rotating step comprises the step of:
alternately rotating the molds in opposite directions between the work stations.

12. A system for the manufacture of molded packings comprising:
support means for rotationally moving between at least one work station and another work station;
at least first and second mold boxes having respectively packing defining plugs located therein and positioned on said support means so that when one mold box is at one work station to receive foaming material, another mold box is at the other work station for mold preparation;
a foaming material feeding gun at said one work station to place a foaming material into a mold box enclosing a plug;
means for moving said gun during foam placement at said one work station in a predetermined pattern with respect to a mold box rotated to said one work station;
means to cause a closure of a mold box following injection of foaming material therein to enable formation of a packing inside the closed mold box;
means for sensing when said gun is at a preselected position to enable said rotation by said support means when said gun is at said preselected position;
means for sensing the placement of a separation sheet over a mold plug to enable actuation of said foaming material placing means when a separation sheet is sensed;
means responsive to the sensed position of said gun and the sensed placement of a separation sheet to enable a rotation of said support means so as to rotate a mold box enclosing a separation sheet over a mold plug to said one work station.

13. The system as claimed in claim 1 wherein said rotation enabling means further includes:

manually actuated control switch means located at said other work station.

14. The system as claimed in claim 12 wherein said rotation enabling means further includes:
  means for determining when said foaming material has cured to enable said rotation.

15. The system as claimed in claim 12 and further including:
  a vacuum and air release assembly means operatively associated with each mold box to alternately draw a vacuum and supply air between a separation sheet and a mold box.

16. The system as claimed in claim 15 and further including:
  means for activating the vacuum and air release assembly means to cause a said vacuum; and
  means for activating the vacuum and air release assembly a predetermined time after placement of foaming material to cause a said supply of air for release of a molded packing from a mold box.

17. The system as claimed in claim 12
  first drive means for controlling the motion of the gun in a first direction;
  second drive means for controlling the motion of the gun in a second direction that is generally transverse to said first direction;
  wherein said first drive means includes a first array of pattern control elements operatively aligned parallel to said first direction and individually adjustable therealong and means associated with said first array of elements for generating pattern control signals respectively representative of the position of said elements along said first direction; and
  wherein said second drive means includes a second array of pattern control elements operatively aligned parallel to said second direction and individually adjustable therealong, and means associated with said second array of elements for generating pattern control signals respectively representative of the position of said latter elements along the second direction.

18. The system as claimed in claim 17
  wherein said first and second drive means each further include:
  a pattern control bar aligned parallel to said respective directions and provided with a plurality of said arrays on respectively separate surfaces of the bar, and means for adjustably mounting said bars to enable selection of an array of pattern control elements for operation along a direction.

19. The system as claimed in claim 18 wherein said pattern control elements are movable cams.

20. The system as claimed in claim 12 and further including:
  means for sensing the positions of respective mold boxes relative to said work stations; and
  means responsive to said sensed positions of the mold boxes to enable pressurizing of one mold box for release of a packing therefrom and enabling the evacuation of air from another mold box.

21. A system for manufacturing molded packings from a mold comprising:
  means for successively rotating at least a first and a second mold between at least first and second work stations so that when one mold is at one work station another mold is at the other work station;
  a separator sheet being placed in operative relationship inside a mold when it is at said one work station;
  means for evacuating air from the space between the separator sheet and the molds over which the sheet is placed to enable the separator sheet to be drawn into cavities of the mold and maintaining the evacuation of air at least until the mold with the separator sheet has been rotated to the other work station;
  means for supplying a foaming material to the mold rotated to the other work station from a dispensing gun;
  means for sensing selectable discrete positions of the gun along orthogonally related directions;
  means for controlling, in response to said sensed gun positions, the movement of the gun along said directions to establish a preselected precisely repeatable pattern for the motion of the dispensing gun;
  means for opening and closing the molds;
  means for alternately rotating the molds in opposite directions so that the mold to which foaming material has been supplied at the other work station is rotated to the one station while the other mold to which a separator sheet is supplied is rotated to the other work station; and
  means for blowing air into the space between the separator sheet and the mold which has cured foaming material to levitate the molded packing therefrom and facilitate removal thereof.

* * * * *